United States Patent
Curtis (10) Patent No.: US 10,254,815 B2
(45) Date of Patent: Apr. 9, 2019

(54) USING CAPACITIVE PROXIMITY DETECTION WITH RESISTIVE TOUCH SCREENS FOR WAKE-UP

(71) Applicant: Microchip Technology Incorporated, Chandler, AZ (US)

(72) Inventor: Keith E. Curtis, Gilbert, AZ (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 603 days.

(21) Appl. No.: 14/182,024

(22) Filed: Feb. 17, 2014

(65) Prior Publication Data
US 2014/0253500 A1  Sep. 11, 2014

Related U.S. Application Data

(60) Provisional application No. 61/775,315, filed on Mar. 8, 2013.

(51) Int. Cl.
*G06F 1/3234* (2019.01)
*G06F 3/044* (2006.01)
(Continued)

(52) U.S. Cl.
CPC .......... *G06F 1/3262* (2013.01); *G06F 1/3215* (2013.01); *G06F 1/3231* (2013.01);
(Continued)

(58) Field of Classification Search
CPC ...... G06F 1/3262; G06F 1/3231; G06F 3/044; G06F 3/0416
See application file for complete search history.

(56) References Cited

U.S. PATENT DOCUMENTS

| 5,945,980 A | * | 8/1999 | Moissev | G06F 3/044 178/18.01 |
| 6,424,094 B1 | | 7/2002 | Feldman | 315/169.3 |

(Continued)

FOREIGN PATENT DOCUMENTS

| EP | 2085861 A1 | 8/2009 | ............ G06F 3/044 |
| JP | 2008152468 A | 7/2008 | ............ G06F 3/041 |
| TW | 201118699 A | 6/2011 | ............ G06F 3/044 |

OTHER PUBLICATIONS

International Search Report and Written Opinion, Application No. PCT/US2014/019626, 11 pages, dated May 21, 2014.
(Continued)

*Primary Examiner* — Nitin Patel
*Assistant Examiner* — Robert M Stone
(74) *Attorney, Agent, or Firm* — Slayden Grubert Beard PLLC (57) ABSTRACT

Power consumption of a device having a resistive touch screen may be reduced if the resistive touch screen is not scanned unless a touch thereto is imminent, especially if the device can remain in a low power sleep mode during no-touch inactivity. Furthermore, detecting a potential touch earlier then an actual first touch may improve initial touch response time. The resistive touch screen may comprise top and bottom Indium Tin Oxide (ITO) coated planes. The top ITO coated plane may be used as a capacitive proximity detector and the bottom ITO coated plane may be used as a guard shield for the top ITO coated plane to significantly reduce parasitic capacitance thereof and enhance the sensitivity of capacitive proximity detection. The device may also remain in a low power sleep mode until a potential touch is detected thereby further saving device power consumption.

22 Claims, 6 Drawing Sheets

(51) Int. Cl.
*G06F 1/3215* (2019.01)
*G06F 3/045* (2006.01)
*G06F 1/3231* (2019.01)
*G06F 3/041* (2006.01)

(52) U.S. Cl.
CPC .............. *G06F 3/044* (2013.01); *G06F 3/045* (2013.01); *G06F 3/0416* (2013.01); *Y02D 10/173* (2018.01)

(56) References Cited

U.S. PATENT DOCUMENTS

| | | | |
|---|---|---|---|
| 7,460,441 B2 | 12/2008 | Bartling | 368/118 |
| 7,764,213 B2 | 7/2010 | Bartling et al. | 341/152 |
| 8,525,811 B2* | 9/2013 | Lee | G06F 3/044 345/174 |
| 2004/0021632 A1* | 2/2004 | Lou | G06F 1/3203 345/156 |
| 2004/0024927 A1* | 2/2004 | Hulvey | G06F 1/3215 710/1 |
| 2004/0095336 A1* | 5/2004 | Hong | G06F 3/045 345/173 |
| 2004/0155871 A1* | 8/2004 | Perski | G06F 3/041 345/174 |
| 2007/0031161 A1* | 2/2007 | Iandoli | B29C 45/14778 399/81 |
| 2008/0061800 A1* | 3/2008 | Reynolds | G01R 27/2605 324/678 |
| 2008/0158182 A1* | 7/2008 | Westerman | G06F 3/0416 345/173 |
| 2008/0231603 A1* | 9/2008 | Parkinson | B60K 35/00 345/173 |
| 2008/0316182 A1* | 12/2008 | Antila | G06F 3/044 345/173 |
| 2009/0127003 A1* | 5/2009 | Geaghan | G06F 3/0416 178/18.03 |
| 2009/0194341 A1* | 8/2009 | Nousiainen | G06F 1/3203 178/18.01 |
| 2009/0284398 A1* | 11/2009 | Shen | G06F 3/0414 341/33 |
| 2010/0037709 A1* | 2/2010 | Yeh | G01L 1/205 73/862.046 |
| 2010/0127717 A1* | 5/2010 | Cordeiro | G06F 3/0416 324/678 |
| 2010/0181180 A1 | 7/2010 | Peter | 200/5 R |
| 2010/0182270 A1* | 7/2010 | Caliskan | G06F 1/3262 345/174 |
| 2010/0245284 A1 | 9/2010 | Ito | 345/174 |
| 2010/0245286 A1* | 9/2010 | Parker | G06F 3/0416 345/174 |
| 2010/0295804 A1* | 11/2010 | Takeuchi | G02F 1/13338 345/173 |
| 2011/0037722 A1* | 2/2011 | Tseng | G06F 3/0416 345/174 |
| 2011/0050619 A1* | 3/2011 | Griffin | G06F 3/0416 345/174 |
| 2011/0067933 A1* | 3/2011 | Chang | G06F 3/044 178/18.05 |
| 2011/0193809 A1* | 8/2011 | Walley | G06F 3/044 345/173 |
| 2012/0193130 A1* | 8/2012 | Fix | G06F 3/047 174/255 |
| 2012/0218210 A1 | 8/2012 | Decaro et al. | 345/173 |
| 2013/0099804 A1* | 4/2013 | Kim | G06F 3/044 324/679 |

OTHER PUBLICATIONS

Bohn, Bruce, "AN1250: Microchip CTMU for Capacitive Touch Applications," Microchip Technology Incorporated, 22 pages, Jan. 16, 2009.
Perme, Thomas et al., "AN1298: Capacitive Touch Using Only an ADC ("CVD")," Microchip Technology Incorporated, 4 pages, Mar. 26, 2009.
Curtis, Keith et al., "AN1325: mTouch™ Metal Over Cap Technology," Microchip Technology Incorporated, 8 pages, Jan. 5, 2010.
Yedemale, Padmaraja et al., "AN1375: See What You Can Do with the CTMU," Microchip Technology Incorporated, 12 pages, Feb. 18, 2011.
Davison, Burke, "AN1478: mTouch™ Sensing Solution Acquisition Methods Capacitive Voltage Divider," Microchip Technology Incorporated, 28 pages, Oct. 26, 2012.
Gao, Xiang, "AN1492: Microchip Capacitive Proximity Design Guide," Microchip Technology Incorporated, 8 pages, Nov. 29, 2012.
Davison, Burke, "AN1334: Techniques for Robust Touch Sensing Design," Microchip Technology Incorporated, 30 pages, Nov. 29, 2012.
Taiwan Notice of Allowance, Application No. 103108023, 5 pages, dated Jul. 24, 2017.
Chinese Office Action, Application No. 201480003786.0, 9 pages, dated Nov. 15, 2017.
Anonymous, "Three-State Logic," Wikipedia, URL: https://en.wikipedia.org/w/index.php?title=Three-state_logic&oldid=540860728, 2 pages, Feb. 27, 2013.
European Office Action, Application No. 14712842.5, 7 pages, dated Sep. 7, 2018.

* cited by examiner

USING CAPACITIVE PROXIMITY DETECTION WITH RESISTIVE TOUCH SCREENS FOR WAKE-UP

RELATED PATENT APPLICATION

This application claims priority to commonly owned U.S. Provisional Patent Application Ser. No. 61/775,315; filed Mar. 8, 2013; which is hereby incorporated by reference herein for all purposes.

TECHNICAL FIELD

The present disclosure relates to devices having touch screens for interfacing with a human operator, and, more particularly, to using capacitive proximity detection to wake-up the electronic circuits used with the touch sensor screen in order to conserve power when the touch screen is not in use.

BACKGROUND

Figure 1:
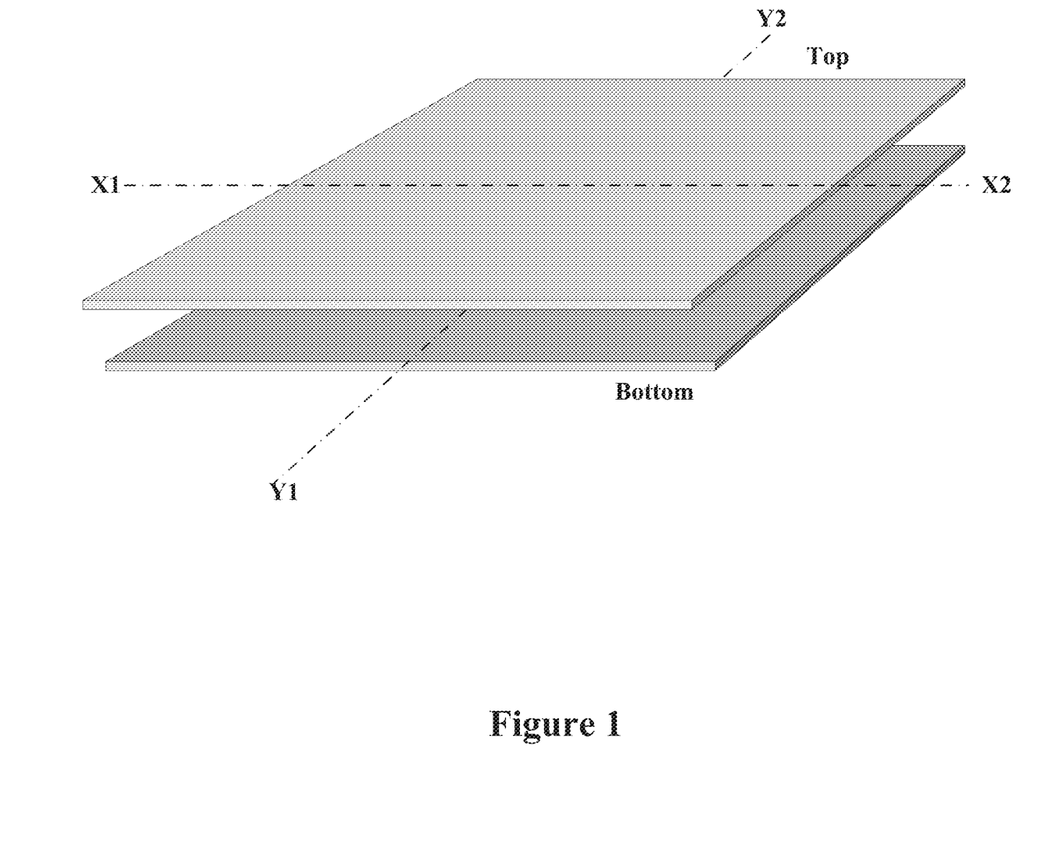
FIG. 1 illustrates a diagram of a resistive touch screen.

Referring to FIG. 1, depicted is diagram of a resistive touch screen that may comprise two planes made of plastic layers having Indium Tin Oxide (ITO) coatings on a surface of each plane (ITO is a substantially clear conductive coating), thereby forming conductive ITO coatings facing each other. At least one of these plastic layers may be flexible or deformable wherein during a touch thereto the two ITO coatings electrically connect together at the touch point and create horizontal (X) and vertical (Y) orientation potentiometers. The top layer may be transparent and also used as a display of information to the user. To scan the touch screen for a touch thereto, one ITO coated plane is tied to a power supply common, $V_{SS}$, and the other ITO coated plane may be pulled up to a power supply voltage, $V_{DD}$, through a resistor. When the two ITO coatings touch, the ITO coating at $V_{DD}$ is pulled toward the power supply common, $V_{SS}$, e.g., ground, and scanning of the touch screen is triggered. Scanning puts $V_{DD}$ on one end of the ITO coated plane and grounds the other end thereof. The opposite ITO coated plane is then measured repeatedly until the voltage thereon settles. Then this process is reversed for the other ITO coated plane so as to determine the touch in the second direction, e.g., x, y coordinate. Settling time for a given plane scan (2x) can be hundreds of microseconds. During these scans and settling times, current (power) must be expended even if there is not a touch present. Therefore power is being used unnecessarily during periods of inactivity or non-use of the touch screen.

SUMMARY

Therefore, a need exists for a way to save power in a device having a resistive touch screen when the touch screen is not in use without sacrificing perform or response time when in use.

According to an embodiment, an apparatus having a capacitive proximity detector and a resistive touch screen may comprise: a first conductive plane having a resistance between opposite edges thereof; a second conductive plane having a resistance between opposite edges thereof and located parallel with the first conductive plane; a first pair of tri-state drivers, wherein an output from one of the first pair may be coupled to an edge of the first conductive plane and an output from the other one of the first pair may be coupled to an opposite edge of the first conductive plane; a second pair of tri-state drivers, wherein an output from one of the second pair may be coupled to an edge of the second conductive plane and an output from the other one of the second pair may be coupled to an opposite edge of the second conductive plane; wherein the coupled edges of the first conductive plane may be substantially perpendicular to the coupled edges of the second conductive plane; a multiplexer having inputs that may be coupled to respective ones of the edges of the first and second conductive planes; an analog-to-digital converter (ADC) that may have an analog input coupled to an output of the multiplexer; a capacitance measurement circuit that may be coupled to one of the edges of the first conductive plane; and a digital processor that may have digital outputs coupled to signal and tri-state control inputs of the first and second pairs of tri-state drivers, a multiplexer control output that may be coupled to the multiplexer, at least one input and at least one output that may be coupled to the capacitance measurement circuit, and at least one digital input that may be coupled to at least one digital output of the ADC; wherein the digital processor may charge the first conductive plane to a first voltage with at least one of the first pair of tri-state drivers, the first conductive plane may be coupled to the capacitance measurement circuit and the analog input of the ADC through the multiplexer, the capacitance measurement circuit may modify the first voltage on the first conductive plane, the ADC may sample the modified first voltage and may provide a digital representation thereof to the digital processor; the digital processor may determine whether a change in the modified first voltage indicates an object proximate to an outward face of the first conductive plane; and if the object may be determined to be proximate to the outward face of the first conductive plane then the digital processor may use the first and second tri-state drivers to configure the first and second conductive planes into a resistive touch screen.

According to a further embodiment, the modified first voltage represents a capacitance of the first conductive plane. According to a further embodiment, the capacitance measurement circuit may comprise a capacitive voltage divider (CVD) circuit. According to a further embodiment, the capacitance measurement circuit may comprise a charge time measurement unit (CTMU) circuit. According to a further embodiment, the first conductive plane may be a flexible substrate coated with Indium Tin Oxide (ITO According to a further embodiment, the first conductive plane may be substantially transparent According to a further embodiment, the second conductive plane may be coated with Indium Tin Oxide (ITO) and the ITO coatings of the first and second conductive planes may face each other, whereby when a touch may be applied to the face of the first conductive plane the ITO coatings between the first and second conductive planes make contact at a location of the touch and the digital processor may thereby determine the touch location. According to a further embodiment, the digital processor may charge the second conductive plane to the first voltage with at least one of the second pair of tri-state drivers.

According to a further embodiment, the first and second pairs of tri-state drivers, the multiplexer, the ADC, the capacitance measurement circuit and the digital processor may be provided in a microcontroller integrated circuit. According to a further embodiment, the microcontroller integrated circuit may have a low power sleep mode that may periodically wake up sufficient circuits therein to determine whether an object may be proximate to the outward face of the first conductive plane. According to a further embodiment, the object may comprise a fingertip of a user.

According to a further embodiment, the first voltage may be at substantially a power supply voltage. According to a further embodiment, the first voltage may be at substantially a power supply common.

According to another embodiment, a method for determining whether an object may be proximate to a resistive touch screen and thereafter enabling the resistive touch screen for determining touches thereto may comprise the steps of: charging a first conductive plane to a first voltage; coupling the charged first conductive plane to a capacitance measurement circuit; modifying the first voltage on the first conductive plane with the capacitance measurement circuit; measuring the modified first voltage; determining from the measured modified first voltage whether an object may be proximate to the first conductive plane; reconfiguring the first conductive plane and a second conductive plane parallel to the first conductive plane into a resistive touch screen when the object has been determined to be proximate to the first conductive plane; and scanning the first and second conductive planes to determine where a touch may be applied thereto.

According to a further embodiment of the method, the step of charging the conductive plane to the first voltage after the step of charging the first conductive plane to the first voltage may be added. According to a further embodiment of the method, the step of maintaining a low power sleep mode and periodically waking up from the low power sleep mode to detect the object proximate to the top conductive plane may be added. According to a further embodiment of the method, the he first conductive plane may be a flexible substrate coated with Indium Tin Oxide (ITO). According to a further embodiment of the method, the second conductive plane may be coated with Indium Tin Oxide (ITO) and the ITO coatings of the first and second conductive planes face each other, whereby when the touch may be applied to the face of the first conductive plane the ITO coatings between the first and second conductive planes make contact at where the touch may be applied thereto and a touch location may be thereby determined.

According to yet another embodiment, a method for determining whether an object may be proximate to a resistive touch screen and thereafter enabling the resistive touch screen for determining touches thereto may comprise the steps of: determining whether an object may be proximate to a face of a first substrate in parallel with an located over a second substrate; scanning the first and second substrates when the object has been determined to be proximate to the face of the first substrate; detecting a touch to the face of the first substrate; and determining a location of the touch on the face of the first substrate. According to a further embodiment of the method, the steps of detecting the touch and determining the location may be done through a resistive touch screen.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments of this disclosure, eliminating no-touch scanning of a resistive touch screen of a device will reduce current consumption thereof, especially if the device can remain in a low power sleep mode during no-touch inactivity. Furthermore, detecting a potential touch earlier then an actual first touch will improve initial touch response time. According to various embodiments of this disclosure, using the top ITO coated plane as a capacitive proximity detector and the bottom ITO coated plane as a guard shield for the top ITO coated plane will significantly reduce parasitic capacitance and thereby enhance the sensitivity of capacitive proximity detection. By using a proximity threshold to detect when to scan the touch screen by detecting when a user's hand is near the touch screen will greatly reduce overall power consumption by the touch screen and related interface circuits when no touch thereto is imminent. And where applicable, waking up a device coupled to the touch screen only when a touch is imminent can further save on power consumption. These features are especially important in battery powered devices.

No additional components or connection costs are required to implement a capacitive proximity detector in combination with the resistive touch screen, only the software programming to perform the proximity detection. No more wasted scans of the touch panel when the user is not about to touch the screen, and faster power down after a touch input has been processed.

Referring now to the drawing, the details of specific example embodiments are schematically illustrated. Like elements in the drawings will be represented by like numbers, and similar elements will be represented by like numbers with a different lower case letter suffix.

Figure 2:
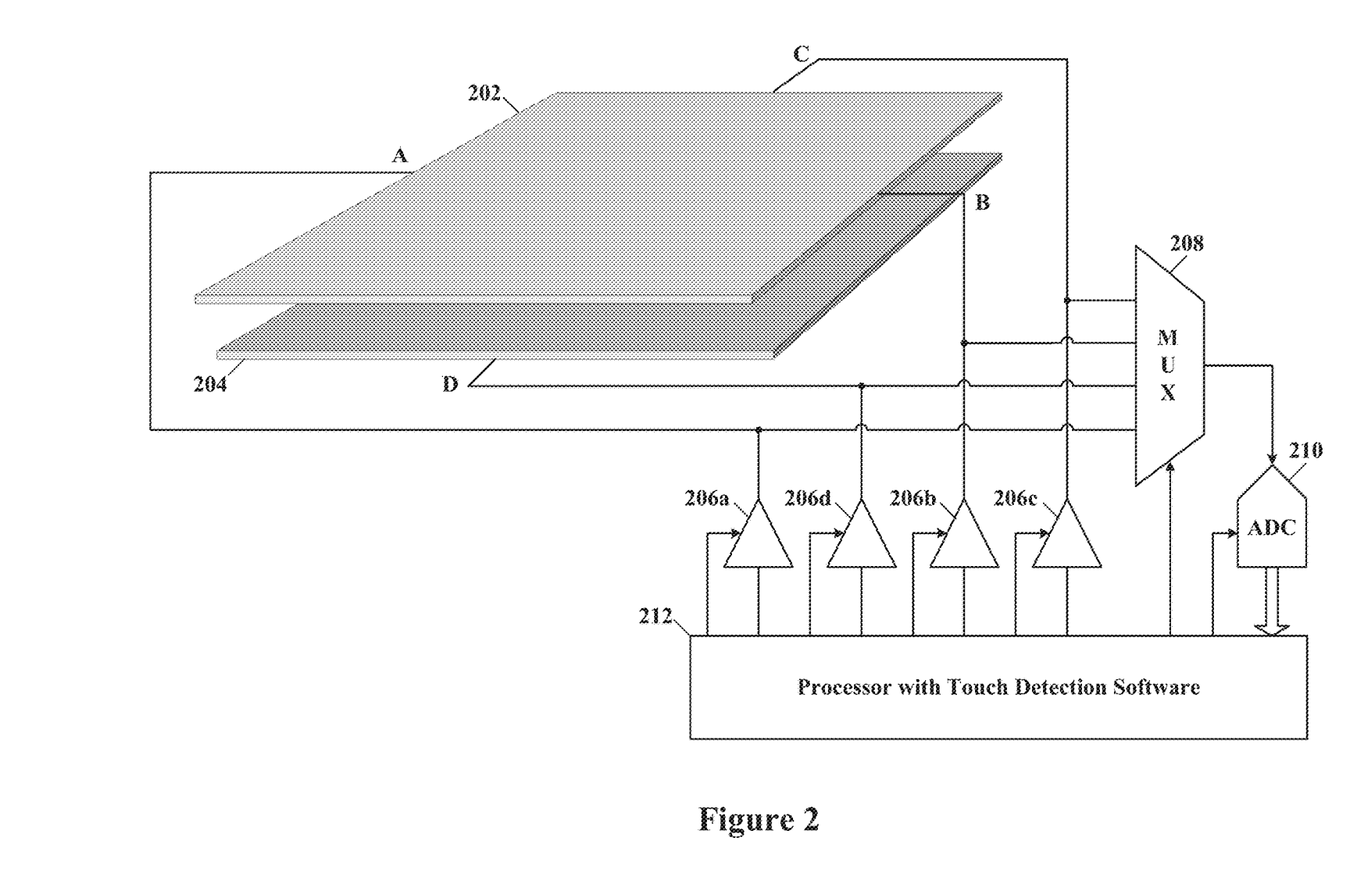
FIG. 2 illustrates a schematic block diagram of a resistive touch screen and interface electronics thereto.

Referring to FIG. 2, depicted is a schematic block diagram of a resistive touch screen and interface electronics thereto. The resistive touch screen may have two connections made thereto, one on either side thereof, to each of the conductive ITO coated planes 202 and 204, one with an X-orientation (e.g., top plane 202 connections A and B) and the other with a Y-orientation (e.g., bottom plane 204 connections C and D). Tri-state output drivers 206 may be used to couple these connections to ground, $V_{SS}$; a voltage, $V_{DD}$; or go into a high impedance state, e.g., disconnect from $V_{SS}$ and $V_{DD}$. $V_{SS}$ and $V_{DD}$ may be connected to opposite sides of either plane 202 or 204, respectively, or go into a high impedance state so that the voltages on either side of the plane 202 or 204 may be read through a multiplexer 208, by an analog-to-digital converter (ADC) 210 and processed with a digital processor 212. When the top plane 202 is not being touched, scanning operations for the two planes 202 and 204 will unnecessarily consume power, unless all of the tri-state output drivers 206 are put into a high impedance low power consumption mode.

Figure 3:
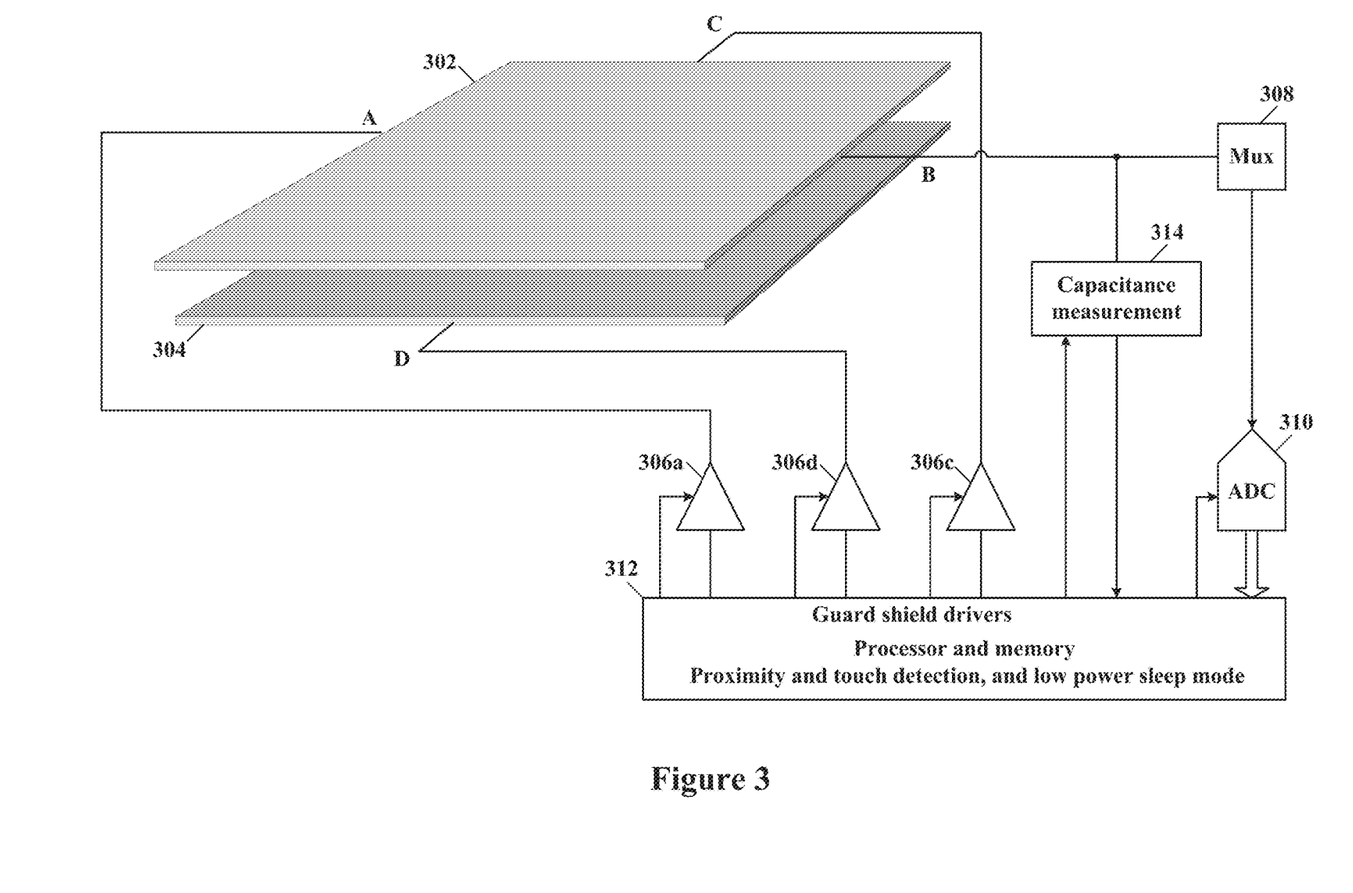
FIG. 3 illustrates a schematic block diagram of a capacitive proximity detector and resistive touch screen configured for proximity detection, according to a specific example embodiment of this disclosure.

Referring to FIG. 3, depicted is a schematic block diagram of a capacitive proximity detector and resistive touch screen configured for proximity detection, according to a specific example embodiment of this disclosure. The conductive plane 302 (top) may be used as a capacitive proximity sensor by detecting a capacitance value change thereof when an object is proximate to the conductive plane 302. The capacitance value change of the conductive plane 302 may be determined by using a capacitance measurement circuit 314, e.g., capacitive voltage divider (CVD), Charge Time Measurement Unit (CTMU), etc., in combination with the ADC 310 that may be coupled to the conductive plane 302 through the multiplexer 308 and thereby measure a charge voltage thereon. A driver 306a may be used to either charge the conductive plane 302 to a voltage, $V_{DD}$, or discharge the conductive plane 302 to a power supply common, $V_{SS}$. The capacitive measurement circuit 314 then may discharge or charge the conductive plane 302 with a constant current source (CTMU) over a defined time period or into a known value capacitance (CVD), and the resulting voltage on the conductive plane 302 may be measured with the ADC 310. CTMU and CVD are but two ways to measure capacitance of the conductive plane 302. It is contemplated and within the scope of this disclosure that any type of capacitive measurement may be used, e.g., in determining the capacitance change of the top conductive plane 302 that indicates proximity of an object, e.g., hand or finger of a user to the touch screen.

Proximity detection is disclosed in Microchip Technology Incorporated application note AN1492, entitled "Microchip Capacitive Proximity Design Guide" by Xiang Gao (2013). CVD capacitance measurement is disclosed in Microchip application note AN1478, entitled "mTouch Sensing Solution Acquisition Methods Capacitive Voltage Divider" by Burke Davison (2013). CTMU capacitance measurement is disclosed in Microchip application note AN1250, entitled "Microchip CTMU for Capacitive Touch Applications" by Bruce Bohn (2009), and AN1375, entitled "See What You Can Do with the CTMU" by Padmaraja Yedamale and Jim Bartling (2011). Wherein all of these application notes are available at www.microchip.com, and all are hereby incorporated by reference herein for all purposes.

A detailed explanation of the CVD method is presented in commonly owned U.S. patent application Publication No. US 2010/0181180, entitled "Capacitive Touch Sensing using an Internal Capacitor of an Analog-To-Digital Converter (ADC) and a Voltage Reference," by Dieter Peter. A detailed explanation of the CTMU method is presented in commonly owned U.S. Pat. No. 7,460,441 B2, entitled "Measuring a long time period;" and U.S. Pat. No. 7,764,213 B2, entitled "Current-time digital-to-analog converter," both by James E. Bartling; wherein all are hereby incorporated by reference herein for all purposes.

The bottom conductive plane 304 may be used as a capacitive guard shield by driving it to the same voltage as the top conductive plane 302, e.g., a voltage, $V_{DD}$, or power supply common, $V_{SS}$; with the output drivers 306c and/or 306d. By maintaining a voltage on the bottom conductive plane 304 that is substantially the same as the voltage on the top conductive plane 302 being used as a capacitive touch sensor, parasitic capacitances therebetween are significantly reduced. This reduction in parasitic capacitances further allows an increased detection resolution of a change in the capacitance value of the top conductive plane 302 occurring when detecting an object proximate thereto. Using the bottom conductive plane 304 as a capacitive guard shield is optional but may be used to increase the capacitive detection sensitivity when using the conductive plane 302 as a capacitive proximity sensor. Capacitive guard shields are described in Microchip application note AN1478, referenced hereinabove.

Upon detection of an object in proximity to the top conductive plane 302, and in anticipation of a touch to the touch screen, the digital processor 312 may reconfigure the top and bottom conductive planes 302 and 304, respectively, back into a resistive touch screen ready for detecting a touch thereto and location thereof. Further power savings may be achieved by placing the majority of power consuming functions of the digital processor 312 in a low power sleep mode with only enough functions being periodically awakened in the digital processor 312 for detecting an object (e.g., hand or finger) coming into proximity with the touch screen (top plane 302) being used as a capacitive proximity sensor.

Figure 4:
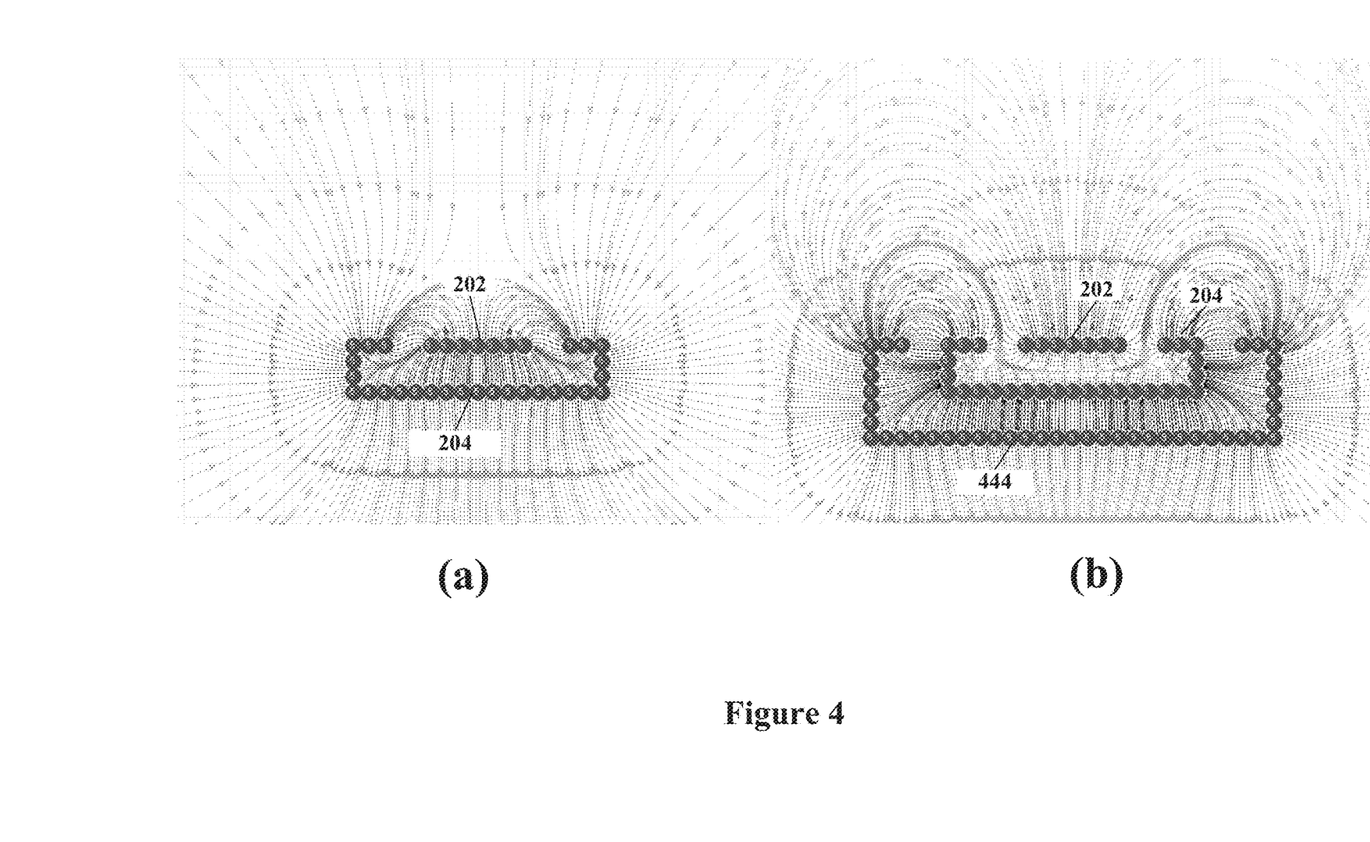
FIG. 4 illustrates schematic representations of electrostatic field lines surrounding a capacitive plane in close proximity to a grounded conductive plane, and electrostatic field lines surrounding a capacitive plane with a guard ring between the capacitive plane and grounded conductive plan.

Referring to FIG. 4, depicted are schematic representations of electrostatic field lines between two conductive surfaces at different voltage potentials, and electrostatic field lines between two conductive surfaces at substantially the same voltage potential. Shown in FIG. 4(a) are electrostatic field lines surrounding the conductive plane 302 that is functioning as a capacitive plane in close proximity to a grounded conductive plane 304, e.g., at different voltage potentials. Note the strong electrostatic field lines between the conductive plane 302 and surrounding metal and/or conductors, e.g., grounded conductive plane 304. This parasitic capacitance limits detection resolution of a change in the capacitance value of the conductive plane 302 occurring during proximity detection of a user. It also limits the amount of noise shielding that may be employed in a touch pad device.

FIG. 4(b) shows a schematic representation of electrostatic fields between the conductive plane 302, guard shield (conductive plane 304) and a ground plane 444, e.g., conductors and metal at ground potential, if present, wherein the conductive plane 302 and the guard shield 304 are at substantially the same voltage potential. Note the much weaker electrostatic field lines (longer lines) between the conductive plane 302 and the ground plane 444. There is substantially no parasitic capacitance between the conductive plane 302 and the guard shield (conductive plane 304) because both are at substantially the same voltage potential. Referring back to FIG. 3, drivers 306c and 306d may drive the conductive plane 302 and 304, respectively, to substantially the same voltage, thereby reducing the electrostatic fields between the conductive plane 302 and surrounding grounded metal, e.g., ground plane 444.

Figure 5:
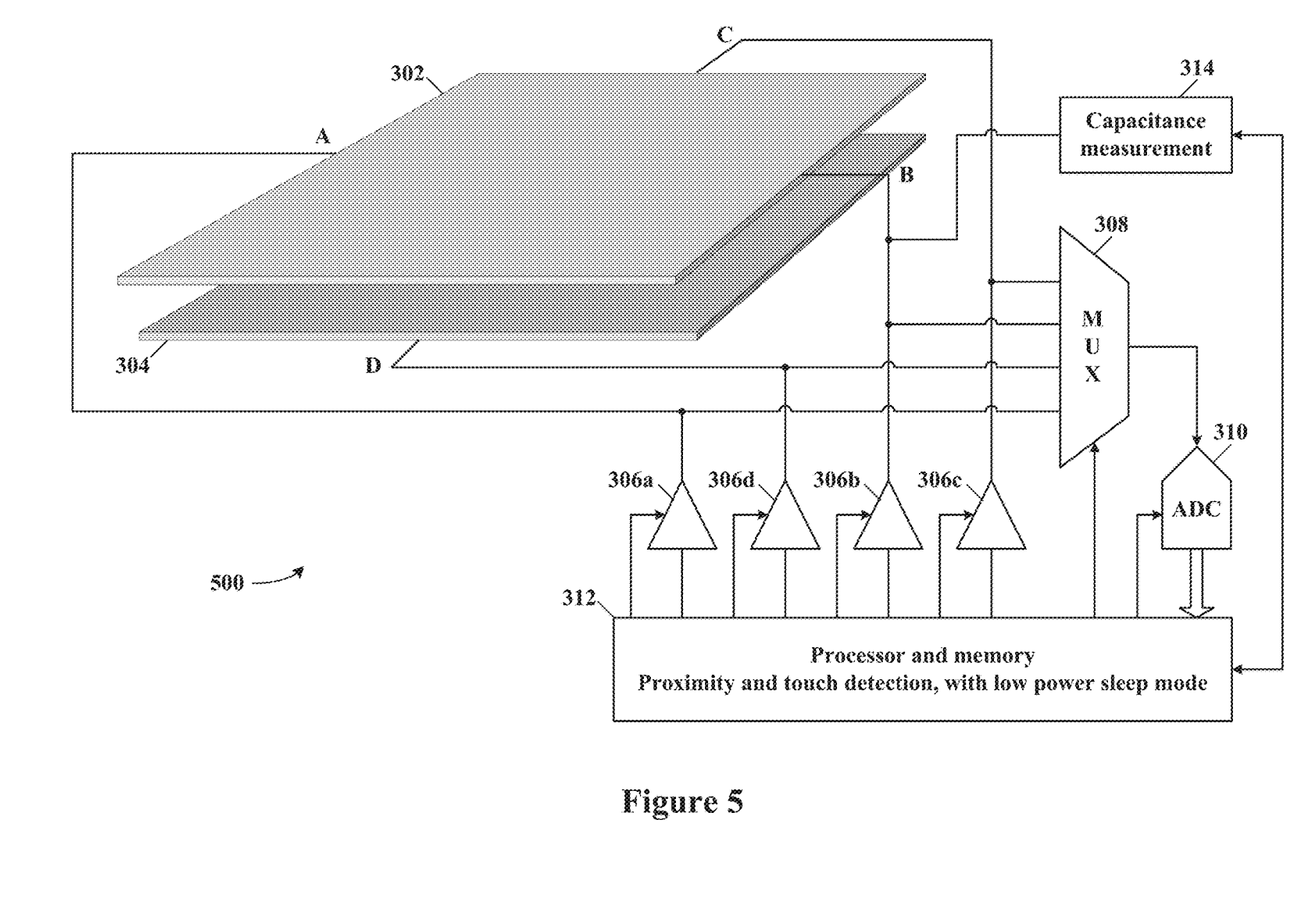
FIG. 5 illustrates a schematic block diagram of a capacitive proximity detector and resistive touch screen configured for touch detection, according to a specific embodiment of this disclosure.

Referring to FIG. 5, depicted is a schematic block diagram of a capacitive proximity detector and resistive touch screen configured for touch detection, according to a specific embodiment of this disclosure. As described more fully hereinabove, the digital processor 312 may detect a capacitive change of the top conductive plane 302 when an object, e.g., user finger(s), is proximate thereto. Then reconfigure the drivers 306 so that the conductive planes 302 and 304 function as a resistive touch screen. Optionally, the digital processor 312 may also use drivers 306d and/or 306c to drive the bottom conductive plane 304 with substantially the same voltage as is on the top conductive plane 302, thereby increasing the capacitive change sensitivity of the top conductive plane 302 when it is being used as a capacitive proximity sensor. For further power savings the digital processor 312, drivers 306, capacitance measurement circuit 314 and ADC 310 may go into a low power sleep mode that periodically wakes up only enough circuitry to detect an object proximate to the conductive plane 302, then once detected activates the resistive touch screen function. The digital processor and memory 312, drivers 306, capacitance measurement circuit 314 and ADC 310 may all be incorporated into a low cost integrated circuit, e.g., microcontroller, digital signal processor, application specific integrated circuit (ASIC), programmable logic array (PLA), etc.

The resistive touch screen, generally represented by the numeral 500, functions as a proximity detector when no object has been detected proximate to the conductive plane 302. Once an object is detected proximate to the conductive plane 302, the tri-state output drivers 306 will reconfigure the top and bottom conductive planes 302 and 304, respectively, to operate as a resistive touch screen in substantially the same manor as the operation of the resistive touch screen shown in FIG. 2. The resistive touch screen 500 may have two connections made thereto, one on either side thereof, to each of the conductive ITO coated planes 302 and 304, one set of the connections having an X-orientation (e.g., top plane 302 connections A and B) and the other set of the connections having a Y-orientation (e.g., bottom plane 304 connections C and D). Tri-state output drivers 306 may be used to couple these connections to ground, $V_{SS}$; a voltage, $V_{DD}$; or go into a high impedance state, e.g., disconnect from $V_{SS}$ and $V_{DD}$. $V_{SS}$ and $V_{DD}$ may be connected to opposite sides of either plane 302 or 304, respectively, or go into a high impedance state so that the voltages on either side of the plane 302 or 304 may be read by the analog-to-digital converter (ADC) 310 through the multiplexer 308 and processed with the digital processor 312.

Figure 6:
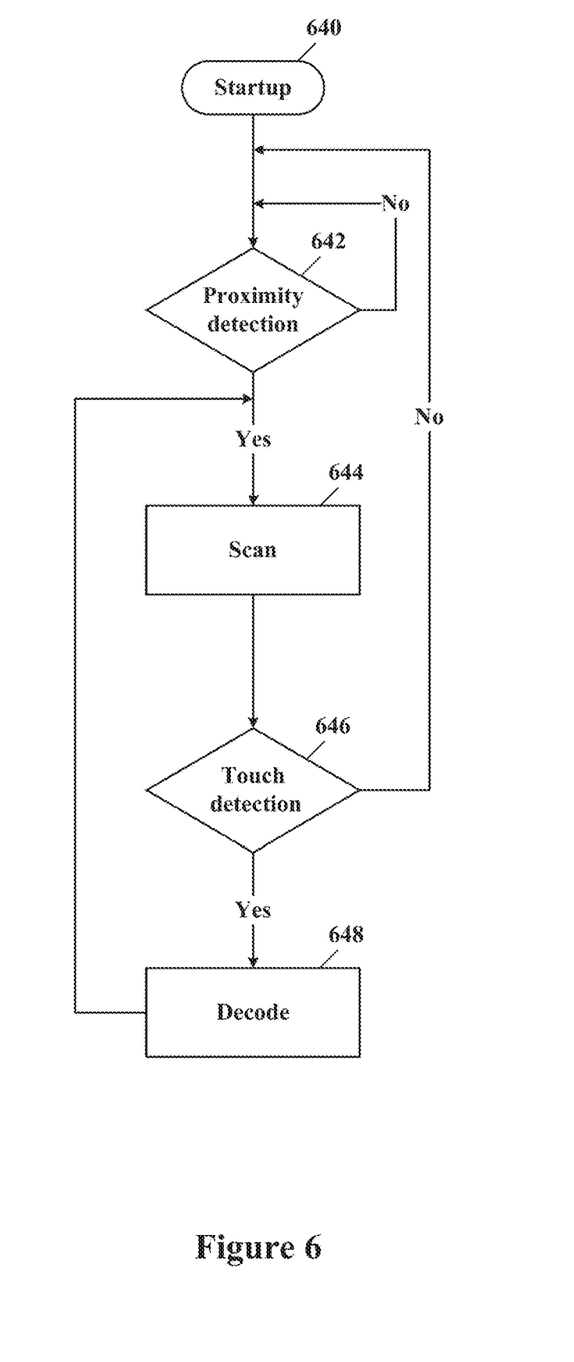
FIG. 6 illustrates a flow chart for detecting an object proximate to the touch screen, determining a touch thereto and its location thereon, according to a specific example embodiment of this disclosure.

Referring to FIG. 6, depicted is a flow chart for detecting an object proximate to the touch screen, determining a touch thereto and its location thereon, according to a specific example embodiment of this disclosure. In step 640 the digital processor 312 may turn on or awake from a sleep mode, e.g., by using a wake-up timer (not shown). In step 642 the top conductive plane 302 may be used as a capacitive sensor to monitor capacitive proximity detection and when an object that is proximate to the top conductive plane 302 is detected, the digital processor 312 reconfigures the top and bottom planes 302 and 304, respectively, to become a resistive touch screen. In step 644 the touch screen is scanned and when a touch is detected in step 646, the location thereof is decoded in step 648. If no touch is detected in step 646 after a certain time, then the digital processor 312 may reconfigure the top and bottom conductive planes 302 and 304, respectively, back to a capacitive proximity sensor and capacitive guard shield, respectively.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus having a capacitive proximity detector and a resistive touch screen, comprising:
   a first conductive plane having a resistance between opposite edges thereof;
   a second conductive plane having a resistance between opposite edges thereof and located parallel with the first conductive plane;
   a first pair of tri-state drivers, wherein an output from one of the first pair is coupled to an edge of the first conductive plane and an output from the other one of the first pair is coupled to an opposite edge of the first conductive plane;
   a second pair of tri-state drivers, wherein an output from one of the second pair is coupled to an edge of the second conductive plane and an output from the other one of the second pair is coupled to an opposite edge of the second conductive plane;
   wherein the coupled edges of the first conductive plane are substantially perpendicular to the coupled edges of the second conductive plane;
   a multiplexer having inputs coupled to respective ones of the edges of the first and second conductive planes;
   an analog-to-digital converter (ADC) having an analog input coupled to an output of the multiplexer;
   a capacitance measurement circuit coupled to one of the edges of the first conductive plane; and
   a digital processor having digital outputs coupled to signal and tri-state control inputs of the first and second pairs of tri-state drivers, a multiplexer control output coupled to the multiplexer, at least one input and at least one output coupled to the capacitance measurement circuit, and at least one digital input coupled to at least one digital output of the ADC;
   wherein
   the digital processor charges the first conductive plane to a first voltage with at least one of the first pair of tri-state drivers,
   the first conductive plane is coupled to the capacitance measurement circuit and the analog input of the ADC through the multiplexer,
   the capacitance measurement circuit modifies the first voltage on the first conductive plane, the ADC samples the modified first voltage and provides a digital representation thereof to the digital processor;
   the digital processor determines whether a change in the modified first voltage indicates an object proximate to an outward face of the first conductive plane; and
   if the object is determined to be proximate to the outward face of the first conductive plane then the digital processor uses the first and second tri-state drivers to configure the first and second conductive planes into a resistive touch screen.

2. The apparatus according to claim 1, wherein the modified first voltage represents a capacitance of the first conductive plane.

3. The apparatus according to claim 1, wherein the capacitance measurement circuit comprises a capacitive voltage divider (CVD) circuit.

4. The apparatus according to claim 1, wherein the capacitance measurement circuit comprises a charge time measurement unit (CTMU) circuit.

5. The apparatus according to claim 1, wherein the first conductive plane is a flexible substrate coated with Indium Tin Oxide (ITO).

6. The apparatus according to claim 5, wherein the first conductive plane is substantially transparent.

7. The apparatus according to claim 5, wherein the second conductive plane is coated with Indium Tin Oxide (ITO) and the ITO coatings of the first and second conductive planes face each other, whereby when a touch is applied to the face of the first conductive plane the ITO coatings between the first and second conductive planes make contact at a location of the touch and the digital processor thereby determines the touch location.

8. The apparatus according to claim 1, wherein the digital processor charges the second conductive plane to the first voltage with at least one of the second pair of tri-state drivers.

9. The apparatus according to claim 1, wherein the first and second pairs of tri-state drivers, the multiplexer, the ADC, the capacitance measurement circuit and the digital processor are provided in a microcontroller integrated circuit.

10. The apparatus according to claim 9, wherein the microcontroller integrated circuit has a low power sleep mode that periodically wakes up sufficient circuits therein to determine whether an object is proximate to the outward face of the first conductive plane.

11. The apparatus according to claim 1, wherein the object comprises a fingertip of a user.

12. The apparatus according to claim 1, wherein the first voltage is at substantially a power supply voltage.

13. The apparatus according to claim 1, wherein the first voltage is at substantially a power supply common.

14. A method for determining whether an object is proximate to a resistive touch screen and thereafter enabling the resistive touch screen for determining touches thereto, the method comprising:
providing a first conductive plane having a resistance between opposite edges thereof:
providing a second conductive plane having a resistance between opposite edges thereof and located parallel with the first conductive plane,
providing at least a first tri-state driver, wherein an output from the first tri-state driver is coupled to an edge of the first conductive plane;
providing a pair of second tri-state drivers, wherein an output from one of the second tri-state drivers is coupled to an edge of the second conductive plane and an output from the other one of the second tri-state driver is coupled to an opposite edge of the second conductive plane, wherein the coupled edges of the first conductive plane are substantially perpendicular to the coupled edges of the second conductive plane;
providing a multiplexer having inputs coupled to respective ones of the edges of the first and second conductive planes;
providing an analog-to-digital converter (ADC) having an analog input coupled to an output of the multiplexer; and
providing a capacitance measurement circuit coupled to one of the edges of the first conductive plane;
while no touch has been detected, said method comprising the steps of:
charging the first conductive plane by coupling the first conductive plane with the first tri-state driver generating a first DC voltage;
controlling the first tri-state driver to be in high impedance and coupling the charged first conductive plane to the capacitance measurement circuit and coupling the first conductive plane with the analog input of the ADC through said multiplexer, wherein the capacitance measurement circuit is a capacitive voltage divider or wherein the capacitance measurement circuit is a charge time measurement unit comprising a constant current source charging or discharging the first conductive plane;
modifying a first charge on the first conductive plane with the capacitance measurement circuit;
measuring a modified first DC voltage with said ADC;
determining from the measured modified first DC voltage whether an object is proximate to the first conductive plane;
reconfiguring the first conductive plane and a second conductive plane parallel to the first conductive plane into a resistive touch screen when the object has been determined to be proximate to the first conductive plane; and
scanning the first and second conductive planes to determine where a touch is applied thereto.

15. The method according to claim 14, further comprising the step of charging the second conductive plane to the second charge after the step of charging the first conductive plane to the first charge.

16. The method according to claim 14, further comprising the step of maintaining a low power sleep mode and periodically waking up from the low power sleep mode to detect the object proximate to the top conductive plane.

17. The method according to claim 14, wherein the first conductive plane is a flexible substrate coated with Indium Tin Oxide (ITO).

18. The method according to claim 14, wherein the second conductive plane is coated with Indium Tin Oxide (ITO) and the ITO coatings of the first and second conductive planes face each other, whereby when the touch is applied to the face of the first conductive plane the ITO coatings between the first and second conductive planes make contact at where the touch is applied thereto and a touch location is thereby determined.

19. The method according to claim 14, wherein the capacitance measurement circuit is a capacitive voltage divider.

20. The method according to claim 14, wherein the capacitance measurement circuit is a charge time measurement unit comprising a constant current source charging or discharging the first conductive plane.

21. The method according to claim 14, wherein the step of charging the first conductive plane to the first charge is performed by an I/O port of a microcontroller.

22. The method according to claim 21, wherein the I/O port comprises the tri-state driver.

* * * * *